Figure 1:
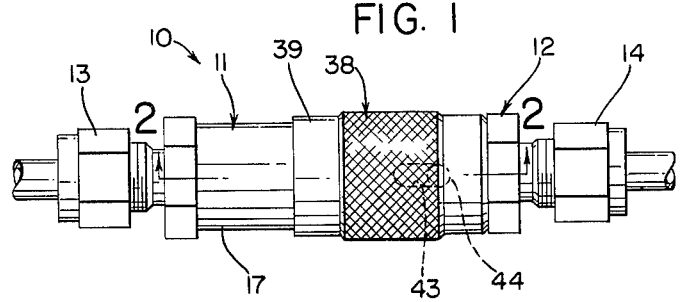

June 14, 1966  B. J. GALLAGHER ETAL  3,255,774
ADJUSTABLE INLINE RELIEF VALVE
Filed Dec. 20, 1962

INVENTORS.
BERNARD J. GALLAGHER &
JONATHAN TASKER
BY
*Fay & Fay*
ATTORNEYS

United States Patent Office 3,255,774
Patented June 14, 1966

3,255,774
ADJUSTABLE INLINE RELIEF VALVE
Bernard J. Gallagher, Cleveland Heights, Ohio, and Jonathan Tasker, Ann Arbor, Mich., assignors to Nuclear Products Company, Cleveland, Ohio, a corporation of Ohio
Filed Dec. 20, 1962, Ser. No. 246,163
10 Claims. (Cl. 137—516.29)

This invention relates to valves, and more particularly to an adjustable inline relief valve.

Valves of the poppet check type have been known and used for many years. There are two principal features of this type of valve. They permit flow of fluid only above a predetermined pressure and only in one direction. Due to these characteristics, the poppet check valve has found many applications. For example, this type of valve is frequently used as a safety relief valve to prevent the pressure in a system from exceeding a predetermined level. Utilizing the other characteristic of poppet check valves, these valves may be used upstream of meters and gauges to insure unidirectional flow and eliminate the possibility of back pressure on the instruments.

Poppet check valves generally are placed in the system in either of two ways. The valve may be inserted as a T-connection with the poppet check at right angles to the main flow line, or the valve may be placed with the poppet check in the valve chamber intermediate of the inlet and outlet ports and physically in the main flow line. The latter type is commonly referred to as an inline valve. The right angle valve is frequently used where the valve is to vent the system to the atmosphere upon a predetermined pressure, whereas the inline valve is ordinarily used where a closed system is desired.

In the theoretical design of a particular fluid system, many factors must be considered. Thus, the particular fluid, the pressure source, and pressure losses due not only to frictional flow along the pipe, but also those losses due to the presence of fittings, valves and the like in the line all must be considered. It particularly has been difficult to determine theoretically the pressure at a specific point in the system so that a check valve operable at that pressure could be inserted. Due to the almost invariable discrepancy between the theoretical calculation and actual conditions, a trial and error technique has been utilized in actual practice. Thus, several poppet check valves, each operable at different pressures, are inserted sequentially in the system until the proper valve is found for the particular application. Such practice is troublesome, time consuming and greatly increases labor costs.

Certain solutions to the above problem have been put forth. In the case of valves with the poppet check valve at right angles to the main flow line and discharging to the atmosphere, it was found that a mechanism could be provided that would vary the spring pressure on the poppet check thereby to vary the opening pressure of the valve. By this arrangement it was possible to use a single valve and simply vary the opening pressure of the valve until the proper setting was obtained. This solution, however, is not readily adaptable to an inline valve where the valve forms an integral part of the system. Thus, in an inline valve, there are sealing problems that are not present in a valve that is discharging to the atmosphere. Also, there is the problem of pressure drop through the valve. The adjusting mechanisms heretofore put forth for the right angle valves would cause an excessive pressure drop when used in an inline valve.

Adjustable inline valves have been suggested wherein the valve must be disconnected from the inlet and, with appropriate tools, an adjustment is made internally of the valve. However, this solution still requires that the valve is disconnected from the line and is thus time consuming and costly.

Accordingly, it is an object of this invention to provide an inline valve that may be adjusted without removal from the line.

It is a further object of this invention to provide an inline valve externally adjustable over a wide range of pressures.

It is a still further object of this invention to provide a valve that is adjustable over a wide range of pressures, yet is compact in size.

It is another object of this invention to provide an adjustable inline valve that includes sealing means, effectively sealing the valve over a wide range of pressures.

Another object of the invention is to provide in an adjustable inline valve adjustment means that will minimize the pressure drop through the valve.

With the problems of the prior art and the above objects in mind, the embodiment of the invention contemplates coaxial inlet and outlet members defining a valve chamber having inlet and outlet ports. A valve member is slidably received in the valve chamber. Sealing means are provided at the inlet port and co-operate with the valve means in closing the port. Gasket means are provided to seal the valve chamber, retain the inlet seal in position, and to co-operate with the valve member in limiting the permissible travel of the valve member in its closing movement. A spring is disposed in the valve chamber with one end of the spring engaging the valve and normally biasing the same to a closing position and the other end of the spring engaging an abutment member carried in the valve chamber. The abutment member is axially moveable in the valve chamber and acts to exert variable compression on the spring so as to vary the biasing effect on the valve member, and thereby vary the opening pressure of the valve. A sleeve is provided externally of the valve and threadedly engages the outlet member. Raceways are provided in both the sleeve and the abutment member and steel balls, or the like, protruding through slots in the outlet member are carried in the raceways. In this manner, longitudinal movement of the sleeve also causes longitudinal movement of the abutment member in the valve chamber so that the compression of the spring is varied.

To the accomplishment of the foregoing and related ends, the following description sets forth in detail one approved means of carrying out the invention. Such disclosed means are not meant to be limiting, constituting but one of the various ways in which the principles of the invention may be used.

Figure 2:
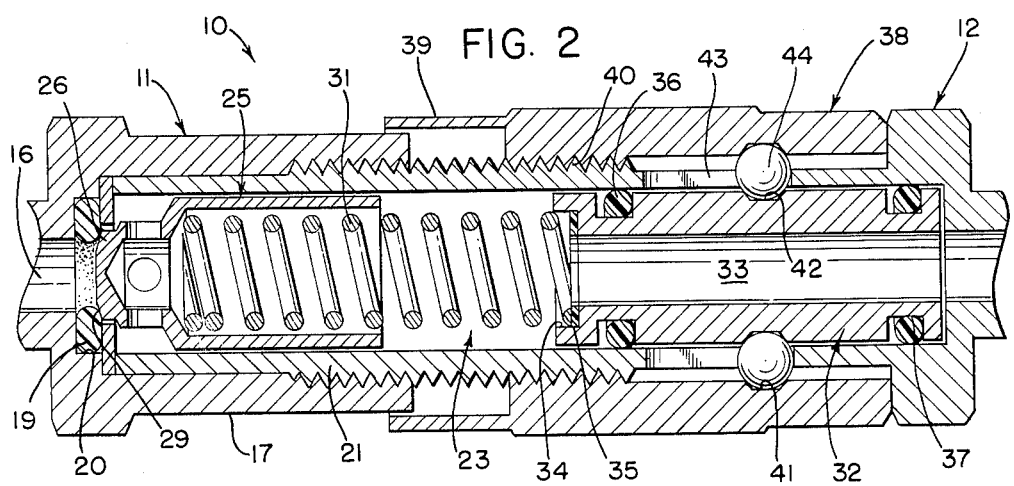
Figure 3:
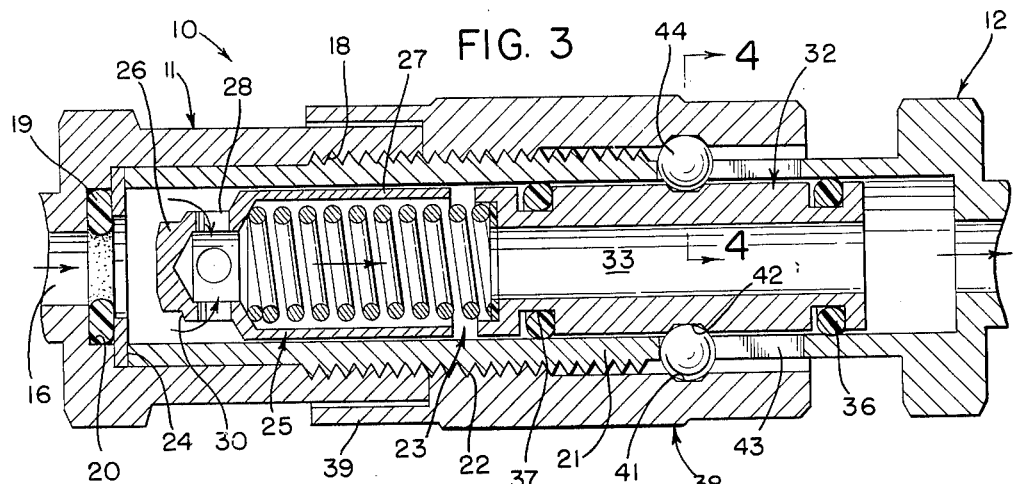
Figure 4:
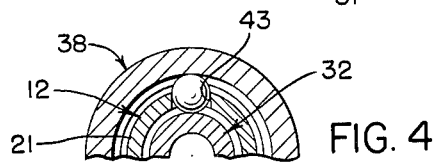

In the drawings:
FIG. 1 is an elevational view of the device;
FIG. 2 is a sectional view, taken along line 2—2 of FIG. 1, showing the valve in closed position;
FIG. 3 is a view similar to FIG. 2 showing the valve in open position with the spring bias on the valve adjusted to a maximum; and
FIG. 4 is a sectional view, taken along line 4—4 of FIG. 3.

Turning more specifically to the drawings, an inline check valve is illustrated generally by the reference numeral 10. The valve includes a body comprised of female inlet member 11 and male outlet member 12. Conventional coupling means 13 and 14 secure the inlet and outlet members, respectively, to the line 15.

The inlet member 11 includes an inlet port 16 and an extension 17 having internal threads 18. A flexible O-ring seal 19 of elastomer or the like is disposed in a recess portion 20 of member 11, surrounding the inlet port 16, and forming a seat for the valving member. The male or outlet member 12 includes an extension 21 closely fitting within extension 17 of the inlet member 11. Threads 22 are disposed intermediate the length of extension 21 and co-operate with threads 18 on extension 17 to secure the inlet and outlet members 11 and 12 together. Members 11 and 12 together form a central valve chamber 23. The valve chamber 23 is sealed by a metal gasket 24 interposed between the valve inlet member 11 and the end of the extension 21. The metal gasket 24 also serves as a means of retaining the O-ring 19 in its recess 20.

A valve member 25 is disposed in the valve chamber 23. Valve member 25 has a seat portion 26 and a rearwardly extending portion 27. The valve member 25 is generally tubular in shape conforming to the configuration of the valve chamber 23 and has openings 28 in the forward portion providing means whereby the fluid may pass through the valve body when the valve member is unseated. The valve seat 26 of valve member 25 has surfaces 29 which abut against the flexible seal 19 to thereby close off the inlet opening 16. Surface 30 on the valve seat 26 is adapted to abut against the metal gasket 24 with the gasket 24 thus serving as a means limiting the extent of the permissible closing movement of the valve 25.

A compression spring 31 is partially disposed in the extension 27 of the valve member 25 and serves to bias the member to a position wherein surface 29 abuts the flexible sealing ring 19.

Disposed at the outlet end of the valve chamber 23 is an abutment member 32. Member 32 has a longitudinal bore 33 of the same diameter generally as the inlet and outlet ports. A recess 34 is provided at the inlet end of the member 32 and is adapted to receive the spring 31. A bearing ring 35 of Teflon or the like is interposed between the spring 31 and the member 32. O-rings 36 are provided in recesses 37 of the member 32.

An adjusting sleeve 38 is telescopically received over the valve 10. The sleeve 38 includes an extension 39 adapted to encircle the extension 17 of inlet member 11 and has a central portion which is knurled to provide a better grip for the operator. Internal threads 40 are provided on the sleeve 38, which threads mesh with the threads 22 on the extension 21 of outlet member 12. Thus, rotation of the sleeve 38 will displace the sleeve axially of the valve body. A raceway 41 is provided on the inner periphery of the sleeve 38 and a similar raceway 42 is provided on the external periphery of the abutment member 32. As shown in FIG. 2, the raceways 41 and 42 are in radial alignment. Slots 43 extend through the extension 21 of outlet member 12, only two slots being shown; however, any number of slots might be used. Hardened steel balls 44 or the like are disposed in the slots 43, the balls 44 being of such a diameter as to extend into both raceways 41 and 42. The above mentioned seals 36 serve to isolate the central chamber from the ball and raceway arrangement. By virtue of this ball and raceway connection, the abutment 32 and the sleeve 38 are effectively coupled together for longitudinal movement, yet allowing the sleeve 38 to rotate relative to the abutment member 32.

*Operation*

In operation, the valve 10 is inserted at the desired location in line 15. Assuming the sleeve to be in the position of FIG. 2, fluid is introduced through inlet 16 and, depending upon the spring constant of spring 31, the valve member 25 will open at a predetermined pressure. When the particular opening pressure has been reached, the force exerted by the fluid will overcome the bias of the spring 31 forcing the valve member 25 away from the inlet opening 16 with the fluid flowing into the valve chamber 23, through openings 28, through bore 33 and on to the line 15.

If it is desired that the valve remain closed until a higher inlet pressure is achieved, the sleeve 38 is rotated whereby the threads 22 and 40 cause the sleeve to move longitudinally of the valve body. Since the balls 44 extend through the slots 43 into raceways 41 and 42, thus interconnecting the sleeve 38 and abutment member 32, the longitudinal movement of the sleeve 38 is transferred to the abutment member 32, thereby causing the member 32 to be displaced longitudinally in the valve chamber 23. The longitudinal movement of the abutment member 32 increases the compression of spring 31 and thereby increases the biasing force exerted on the valve member 25. As the bias of the spring 31 is increased, a higher pressure level is required at the inlet port 16 in order to move the valve member away from its sealing position. FIG. 3 illustrates the valve adjusted for maximum opening pressure. Obviously any number of pressure settings may be achieved, depending upon the particular axial disposition of the sleeve. Indicia may be placed on the extension 17 of the inlet member 11, if desired, whereby the particular pressure setting of the valve can be quickly ascertained.

Two additional features of significance should be emphasized. When the sleeve 38 is being rotated there is a tendency, through the frictional contact of the balls 44, for the abutment member 32 also to rotate. For this reason, as set forth above, a bearing ring 35 of Teflon or the like is interposed between the spring 31 and the abutment member. The bearing ring thereby allows relative rotation between the spring and the abutment member without undesirable transfer of twisting moment to the spring.

Another important feature of this invention resides in the co-operation between the surfaces 30 on the valve seat 26 and the metal retaining gasket 24. In order for an adjustable valve of this nature to be used to its fullest potential, it should be capable of operating over a full range of pressures, thus it should not only be sensitive to extremely low pressures, but it should also be capable of functioning properly at quite high pressures. Coextensive with this consideration is the problem of sealing the inlet port over this wide range of pressures; an inlet seal that is satisfactory at a low operating pressure may be entirely unsatisfactory at higher pressures. At higher pressures the force exerted on the valve member by the biasing spring becomes extreme and there is a tendency for the valve seat on the valve member to deform or unseat the inlet seal, even to the extent of the valve seat pushing through the sealing means. The prior art has recognized this by providing a bevelled surface on both the seat of the valving member and the body seat so that the movement of the valving member is limited physically. However, such an arrangement requires careful machining of both bevels so as to produce both the proper degree of seal compression and sealing characteristics.

This application illustrates a much simpler method of assuring optimum sealing performance without extreme deformation of the inlet seal. Metal retaining gasket 24 extends inwardly of the valve chamber 23 to a position where it is in the path of movement of surface 30 on the valve 25. With this arrangement, as the spring bias on the valve member increases, the tendency of the valve member to deform and push through the sealing ring 19 is restrained, owing to the fact that portion 30 abuts against the retaining ring 24, thereby limiting the longitudinal movement of the valve. As the bias of the spring 31 is increased, further deformation of the ring 19 is prevented. It therefore becomes apparent that the retaining gasket 24 serves three important functions, that is, it retains the sealing ring 19 in position, it serves as a seal for the telescopic connection of extensions 17 and 21, and it serves as a limiting means restraining the longitudinal movement of the valve member.

The above described valve has many applications; in general, it may be used anywhere that a poppet check valve is usable. It is particularly useful in pressure sizing a system. An adjustable valve of the type disclosed may be inserted in a system and adjusted until the particular opening pressure for the system being sized has been determined. Afterwards, the adjustable valve may be replaced by an ordinary check valve having the operating characteristics determined to be appropriate from the sizing operation. The adjustable valve of this invention is also particularly advantageous in a system, such as a laboratory setup, where varying pressures are to be used. A single adjustable valve may be used over the entire range of pressures instead of substituting an ordinary check valve for each different pressure setting. Consequently, through the use of the present valve, it is possible to reduce materially the valve inventory of the laboratory.

For ease of description, the principles of the invention have been set forth in connection with but a single illustrated embodiment. It is not our intention that the illustrated embodiment nor the terminology employed in describing it be limiting inasmuch as variations in these may be made without departing from the spirit of the invention, but rather we desire to be restricted only by the scope of the appended claims.

We claim:

1. An adjustable inline valve having coaxial inlet and outlet members adapted to be inserted into the main flow line of a fluid system,
    said members defining a valve chamber having fixedly spaced inlet and outlet ports,
    sealing means surrounding one of said ports,
    retaining means carried by said inlet and outlet members and securing said sealing means,
    valve means slidable in said valve chamber,
    said valve chamber and said valve means being disposed in the main flow line,
    said valve means including a first portion adapted to co-operate with said sealing means to thereby close said inlet port and a second portion adapted to abut said retaining means,
    abutment means disposed in said valve chamber between said inlet and outlet ports,
    spring means interposed between said valve means and said abutment means, whereby said valve means is biased towards said inlet port,
    sleeve means,
    means telescopically and rotatably mounting said sleeve means on said inlet and outlet members,
    and means extending through openings in the walls of said members and interconnecting said sleeve means and said abutment means, whereby upon rotation of said sleeve means, said abutment means is displaced longitudinally in said valve chamber to thereby vary the bias of said spring on said valve means,
    and seals carried by said abutment means,
    said seals being spaced apart and cooperating with the walls of said chamber to isolate said valve chamber from said openings.

2. An inline adjustable relief valve comprising first and second body members,
    said members defining a valve chamber having first and second ports fixedly spaced from one another,
    sealing means carried by said first body member and surrounding said first port,
    valve means slidable in said valve chamber and co-operating with said sealing means to close said first port,
    abutment means in said valve chamber,
    spring means interposed between said valve means and said abutment means to bias said valve means towards said first port and said abutment means towards said second port,
    adjustment means movably carried on the exterior of one of said inlet and outlet members,
    and means extending through openings in the walls of said body members and interconnecting said adjustment means and said abutment means whereby upon movement of said adjustment means said abutment means is displaced longitudinally of said valve chamber,
    and seals carried by one of said abutment means and said body members,
    said seals being located in said valve chamber adjacent the openings in the walls and cooperating with said abutment means and said body members to isolate said valve chamber from said openings.

3. An inline adjustable relief valve comprising coaxial inlet and outlet members,
    said members defining a valve chamber having fixedly spaced inlet and outlet ports at opposite ends thereof,
    said members including coupling means for connecting said inlet and outlet ports to the flow line of a fluid system whereby fluid may pass through the valve chamber,
    sealing means carried by said inlet member and surrounding said inlet port,
    valve means reciprocable in said valve chamber and cooperating with said sealing means to close said inlet port,
    abutment means reciprocable in said valve chamber and disposed adjacent to said outlet port,
    spring means interposed between said valve means and said abutment means, said spring means biasing said valve means towards said inlet port and said abutment means towards said outlet port,
    limiting means carried by said inlet and outlet members and co-operating with said valve means to limit the longitudinal travel of said valve means under the bias of said spring means,
    adjustment means telescopically received on said inlet and outlet members and mounted for rotation and reciprocable movement relative thereto,
    means extending radially through openings in the walls of said members and interconnecting said adjustment means and said abutment means, whereby upon rotation of said adjustment means said abutment means and said adjustment means are reciprocated, thereby varying the bias of said spring means on said valve means,
    and seals carried by one of said abutment means and said members,
    said seals being located in said valve chamber adjacent the openings in the walls and cooperating with said abutment means and said members to isolate said valve chamber from said openings.

4. An inline adjustable relief valve comprising coaxial first and second body members,
    said members defining a valve chamber having fixedly spaced first and second ports,
    sealing means surrounding said first port,
    retaining means carried by said body members and securing said sealing means in said position surrounding said first port,
    valve means longitudinally slidably disposed in said valve chamber,
    said valve means having a valve seat,
    said valve seat having an axially extending first portion adapted to cooperate with said sealing means to close said first port and an axially extending second portion adapted to co-operate with said retaining means to thereby limit the longitudinal travel of said valve means,
    the length of said portions being such that said first portion extends through said retaining means to engage said sealing means before said second portion engages said retaining means,
    spring means disposed in said chamber and biasing said valve means to a position normally closing said first port,
    adjustment means movably carried by said body members,
    and means operatively connecting said adjustment means and said spring means, whereby upon movement of said adjustment means the biasing effect of said spring on said valve means may be varied.

5. An inline adjustable relief valve comprising a housing adapted to be inserted into the main flow line of a fluid system, said housing defining a valve chamber having fixedly spaced ports at either end thereof, said housing further including coupling means for connecting said ports to the flow line of a fluid system whereby fluid may pass through the valve chamber, closure means slidably disposed in said valve chamber intermediate of said ports and being adapted to close one of said ports, biasing means in said valve chamber and normally biasing said closure means to a position closing said one port, adjusting means movably mounted externally on said housing, and means extending through openings in the walls of said housing operatively connecting said adjusting means to said biasing means, whereby upon movement of said adjusting means the biasing effect of said biasing means on said closure means is varied, and seals carried by one of said biasing means and said housing, said seals being located in said valve chamber adjacent the openings in the walls in said housing and cooperating with said biasing means and said housing to isolate said valve chamber from said openings.

6. A valve comprising a valve body adapted to be inserted in the line of a fluid system, said valve body defining a central valve chamber having inlet and outlet ports, means defining a recess in said valve body adjacent to said inlet port, flexible O-ring sealing means in said recess, metal gasket means carried by said valve body adjacent to said recess to retain said seal in said recess, inlet closure means disposed in said central valve chamber, said closure means having an axially extending first portion adapted to abut said sealing means and thereby close said inlet port, and an axially extending second portion radially outward of said first portion and adapted to abut said gasket means, the axial extent of said first portion being such that said first portion may extend through said gasket means and engage said sealing means with said second portion remaining spaced from said gasket means, and manual means operatively connected to said closure means to move said closure means to a first position wherein said first portion abuts said sealing means with said second portion spaced from said gasket means and, upon further movement, to a second position wherein said first position further compresses said sealing means and said second portion engages said gasket means.

7. An inline adjustable valve comprising a valve body adapted to be inserted in the line of a fluid system, said valve body defining a central valve chamber having inlet and outlet ports, closure means disposed in said central valve chamber and being adapted to close said inlet port, abutment means disposed in said central valve chamber, biasing means interposed between said abutment means and said closure means to bias said closure means to a closing position, said valve body including means defining a plurality of slots extending through the walls of said body member into said central chamber, thread means on the external periphery of said valve body, sleeve means telescopically received on said valve body, said sleeve means including internal thread means meshing with said external thread means, means defining a raceway on the outer periphery of said abutment means, means defining a raceway on the inner periphery of said sleeve member, ball-like members received in each of said slots, and extending through said slots into both said inner peripheral raceway and said outer peripheral raceway whereby said abutment member and said sleeve means are coupled together for longitudinal movement, but said sleeve means is free to rotate relative to said abutment means.

8. The valve of claim 7 wherein said inlet and outlet ports are fixedly spaced in coaxial alignment.

9. A adjustable inline valve adapted to be inserted into the main flow line of a fluid system comprising, a body member, said body member defining a valve chamber having fixedly spaced coaxial first and second ports at either end thereof, valve means slidably disposed in said valve chamber, said valve means having a portion thereof adapted to engage said first port and prevent the flow of fluid therethrough, abutment means in said valve chamber intermediate said first and second ports, said abutment means having a passage therethrough in coaxial alignment with said first and second ports, spring means interposed between said valve means and said abutment means with said spring means normally biasing said valve means toward said first port and said abutment means toward said second port, adjustment means telescopically received on said body member and mounted for rotation and reciprocable movement relative thereto, and means extending through openings in the walls of said body member and interconnecting said adjustment means with said abutment means whereby upon rotation of said adjustment means said abutment means and said adjustment means are moved longitudinally of said body member thereby varying the bias of said spring means on said valve means, and spaced apart seals carried by one of said abutment means and said housing, said seals being located in said valve chamber on opposite sides of said openings in the walls of said housing and cooperating with said abutment means and said body members to isolate said valve chamber from said openings.

10. The valve of claim 5 wherein said biasing means includes abutment means in the valve chamber and spring means interposed between said abutment means and said closure means, said abutment means having a passage therethrough whereby fluid may pass between said spaced ports.

References Cited by the Examiner

UNITED STATES PATENTS

| | | | |
|---|---|---|---|
| 987,218 | 3/1911 | Cordley | 251—361 X |
| 1,288,821 | 12/1918 | Broderick | 137—524 X |
| 2,243,847 | 6/1941 | Hooper et al. | 137—15 |
| 2,525,799 | 10/1950 | Hecker | 251—363 X |
| 2,568,026 | 9/1951 | Pigott | 137—540 X |
| 2,588,157 | 3/1952 | Olson | 137—516.29 |
| 2,838,059 | 6/1958 | Biagi et al. | 137—15 |
| 2,929,401 | 3/1960 | Cowan | 137—516.29 |
| 2,959,188 | 11/1960 | Kepner | 137—540 |
| 3,051,196 | 8/1962 | Miller | 137—516.29 |
| 3,093,155 | 6/1963 | Dawes | 251—340 X |
| 3,108,779 | 10/1963 | Anderson | 251—184 X |

ISADOR WEIL, *Primary Examiner.*

WILLIAM F. O'DEA, *Examiner.*

D. LAMBERT, *Assistant Examiner.*